(12) United States Patent
Li (10) Patent No.: US 6,725,654 B2
(45) Date of Patent: Apr. 27, 2004

(54) VORTEX DEVICE AND SYSTEM FOR TREATING EXHAUST GAS FROM INTERNAL COMBUSTION ENGINE

(76) Inventor: Shusheng Li, Suite 504, Unit 2, No. 18 Building, Honggang Dongcun, Nigang Donglu, Shenzhen, Guangdong Province (CN)

( * ) Notice: Subject to any disclaimer, the term of this patent is extended or adjusted under 35 U.S.C. 154(b) by 0 days.

(21) Appl. No.: 10/300,903

(22) Filed: Nov. 21, 2002

(65) Prior Publication Data

US 2003/0106310 A1 Jun. 12, 2003

(30) Foreign Application Priority Data

Nov. 22, 2001 (CN) .......................... 01129977 U (51) Int. Cl.[7] ................................. F01N 3/10
(52) U.S. Cl. .................. 60/299; 60/295; 60/297; 60/311; 55/359.1; 55/394; 55/399
(58) Field of Search .................. 60/294, 295, 297, 60/299, 311, 300; 55/318, 323, 337, 359.1, 394, 399, 498

(56) References Cited

U.S. PATENT DOCUMENTS

| | | | | |
|---|---|---|---|---|
| 4,345,431 A | * | 8/1982 | Suzuki et al. | 60/286 |
| 4,649,703 A | * | 3/1987 | Dettling et al. | 60/275 |
| 4,693,078 A | * | 9/1987 | Dettling et al. | 60/295 |
| 4,706,454 A | * | 11/1987 | Smith, Jr. | 60/274 |
| 5,367,889 A | * | 11/1994 | Lanyon | 60/297 |
| 6,584,768 B1 | * | 7/2003 | Hecker et al. | 60/297 |

* cited by examiner

*Primary Examiner*—Binh Tran
(74) *Attorney, Agent, or Firm*—Piper Ridnick LLP; Steven B. Kelber (57) ABSTRACT

The present invention is to provide a vortex device for treating exhaust gas of an internal combustion engine, which comprises a first housing having a first end surface and a second end surface; a first inlet positioned on the first end surface and connected to an exhaust tube of the internal combustion engine; a first outlet positioned on the second end surface; a first baffle board fixedly connected to the housing, having a plurality of gas holes; a first vortex mechanism connected to the first baffle board; and a catalytic filter. The invention also provides a system for treating exhaust gas from the internal combustion engine. The system comprises the vortex device, the first treating device, and/or the second treating device and/or a fourth treating device as the internal combustion is a diesel engine.

20 Claims, 10 Drawing Sheets

VORTEX DEVICE AND SYSTEM FOR TREATING EXHAUST GAS FROM INTERNAL COMBUSTION ENGINE

FIELD OF THE INVENTION

The invention generally relates to a system for treating exhaust emission from an internal combustion engine, and particularly is directed to a vortex device for treating exhaust gas emitted from an internal combustion engine and a system containing such a vortex device for fully treating exhaust gas.

RELATED ART

In the prior art, processes treating exhaust emission primarily focus on the following two ways. One is the process of catalytic conversion with noble metals. This process needs to use a catalyst comprising noble metals such as Pt and Pa at a higher proportion to give rise to a higher cost. Moreover, the noble metal even Pt will be oxidized slowly to result in activity loss of the catalyst if the exhaust gas contains NOx and oxygen in a higher proportion. Another is named as the process of filtering by a filter. The currently used filter is generally difficult to treat organic soluble impurities in the exhaust gas. Furthermore, the current filter cannot prevent the exhaust gas from producing sulfates at a temperature of about 500° C. and absorbing of HC at a lower temperature. Therefore, it is needed to set a regenerating treating device for the filter.

BACKGROUND OF THE TECHNOLOGY

The internal combustion engine has been widely used in various transportation vehicles. Exhaust gas emitted from the internal combustion engine comprises CO, $CO_2$, HC and NOx that is one of primary factors resulting in atmosphere pollution and the greenhouse effect of the earth.

SUMMARY OF THE INVENTION

The present invention is to provide a vortex device for treating exhaust gas of the internal combustion engine and a system for fully treating exhaust emission by treating exhaust gas by separate steps to overcome the drawbacks in the prior art.

BRIEF DESCRIPTION OF THE INVENTION

An object of the invention is to provide a vortex device for treating exhaust gas from an internal combustion engine, which comprises a first housing having a first end surface and a second end surface; a first inlet positioned on the first end surface and connected to an exhaust tube of the internal combustion engine; a first outlet positioned on the second end surface; a first baffle board fixedly connected to the housing, having a plurality of gas holes; a first vortex mechanism connected to the first baffle board; and a catalytic filter.

In the invention, the catalytic filter includes a first cylindrical filter casing fixedly connected to the second end surface of the housing; and a second cylindrical filter casing, positioned within the first cylindrical filter casing and connected to the second end surface of the first housing. A gas channel embraced by the second cylindrical filter casing communicates with the first outlet, and a particle catalyst is filled between the first cylindrical filter casing and the second cylindrical filter casing so that exhaust gas can flow from the outside of the first cylindrical filter casing into the inside of the second cylindrical filter casing.

Another object of the invention is to provide a system for treating exhaust gas from the internal combustion engine. The system includes the vortex device defined above, and a first treating device. In an embodiment of the invention, the system further comprises a second treating device. In another embodiment of the invention, the system still comprises a third treating device. The system of the invention comprises the vortex device, the first treating device, the second treating device and a fourth treating device as the internal combustion engine is a diesel engine.

The first treating device of the invention includes a second housing having a third end surface and a fourth end surface; a second inlet positioned on the third end surface; a second outlet positioned on the fourth end surface; a first casing whose one end is fixedly connected to the third end surface and another end has a flow-limiting hole; and a second casing positioned within said first casing, whose one end communicates with said second inlet of the third end surface, and another end shares the same flow-limiting hole with the first casing. Both the side walls of the first casing and the second casing have a plurality of gas holes.

The second treating device includes a third housing having a fifth end surface and a sixth end surface; a third inlet positioned on the fifth end surface; a third outlet positioned on the sixth end surface; a third casing respectively fixedly connected to the fifth end surface and the sixth end surface; and a second baffle board longitudinally positioned between the fifth surface and the sixth end surface. The side wall of the third casing and the portion of the second baffle board between the third housing and the third casing have a plurality of gas holes, and the portion of the second baffle board inside the third casing has a flow-limiting hole.

The third treating device includes a fourth housing having a seventh end surface and a eighth end surface; a fourth inlet positioned on the seventh end surface; a fourth outlet positioned on the eighth end surface; a fourth casing having two closed ends within the fourth housing; a fifth casing within the fourth casing, connected to the two ends of the fourth casing; and a third baffle board longitudinally positioned between the seventh end surface and the eighth end surface, and connected to the housing to support the fourth casing. The portion of the third baffle board between the fourth housing and the fourth casing has a plurality of gas holes, the portion of the third baffle board within the fifth casing has an exhaust opening, and the side walls of the fourth casing and the fifth casing have a plurality of muffling holes.

The fourth treating device is used to replace the third treating device in the system of the invention when the engine is a diesel engine. The fourth treating device includes a sixth housing having a ninth end surface and a tenth end surface; a sixth inlet positioned on the ninth end surface; a sixth outlet positioned on the tenth end surface; a double-filter-element filter fixedly connected to the tenth end surface; and a second vortex mechanism comprising a vortex cone and a cylindrical connection that is fixedly connected to the double-filter-element filter.

With separate devices in the system of the invention, exhaust gas can be treated completely.

DETAILED DESCRIPTION OF THE PREFERRED EMBODIMENTS OF THE INVENTION

The invention will be described in detail in combination of the drawings.

Figure 1:
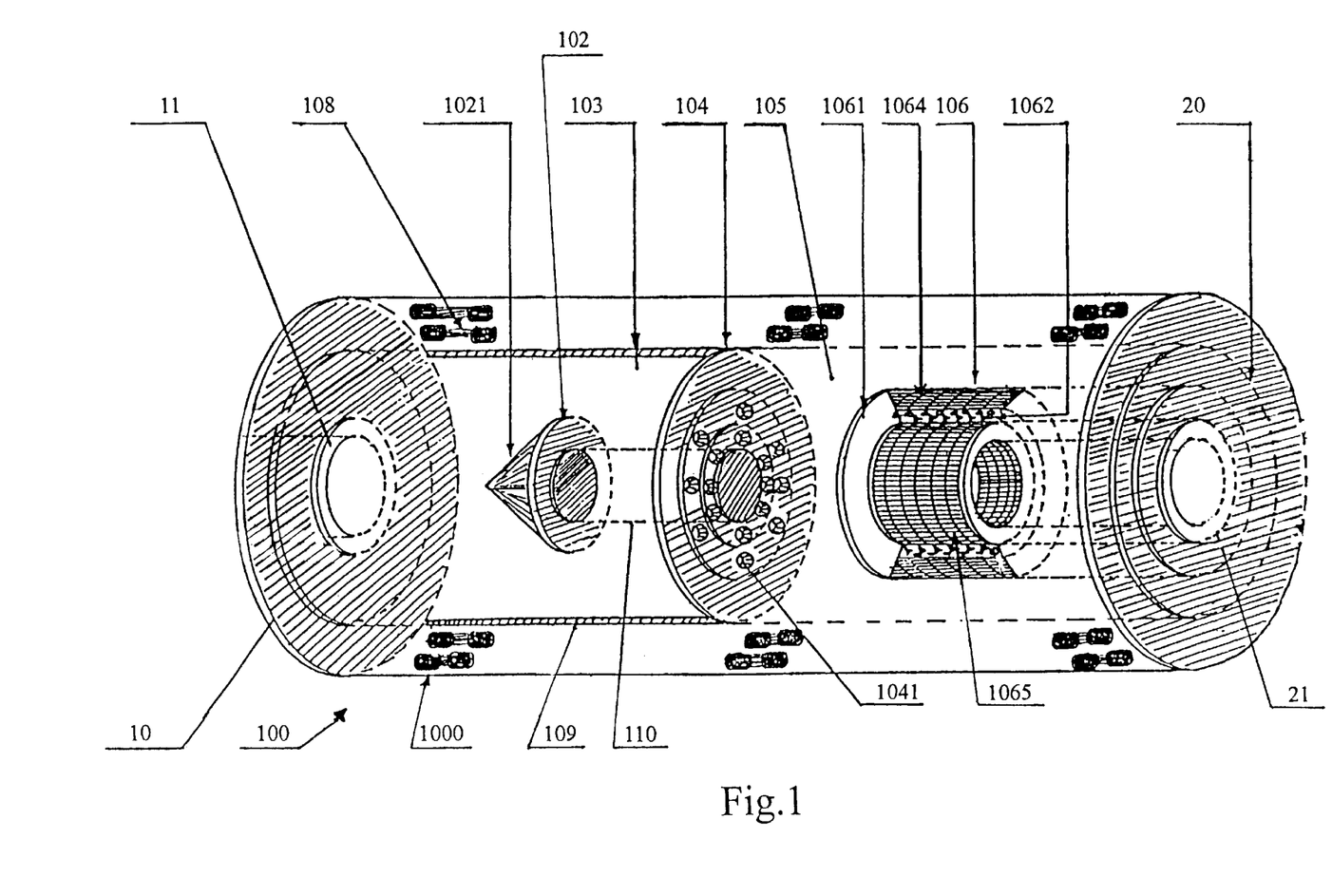
FIG. 1 is a schematic diagram of a vortex device of the invention.
Figure 2:
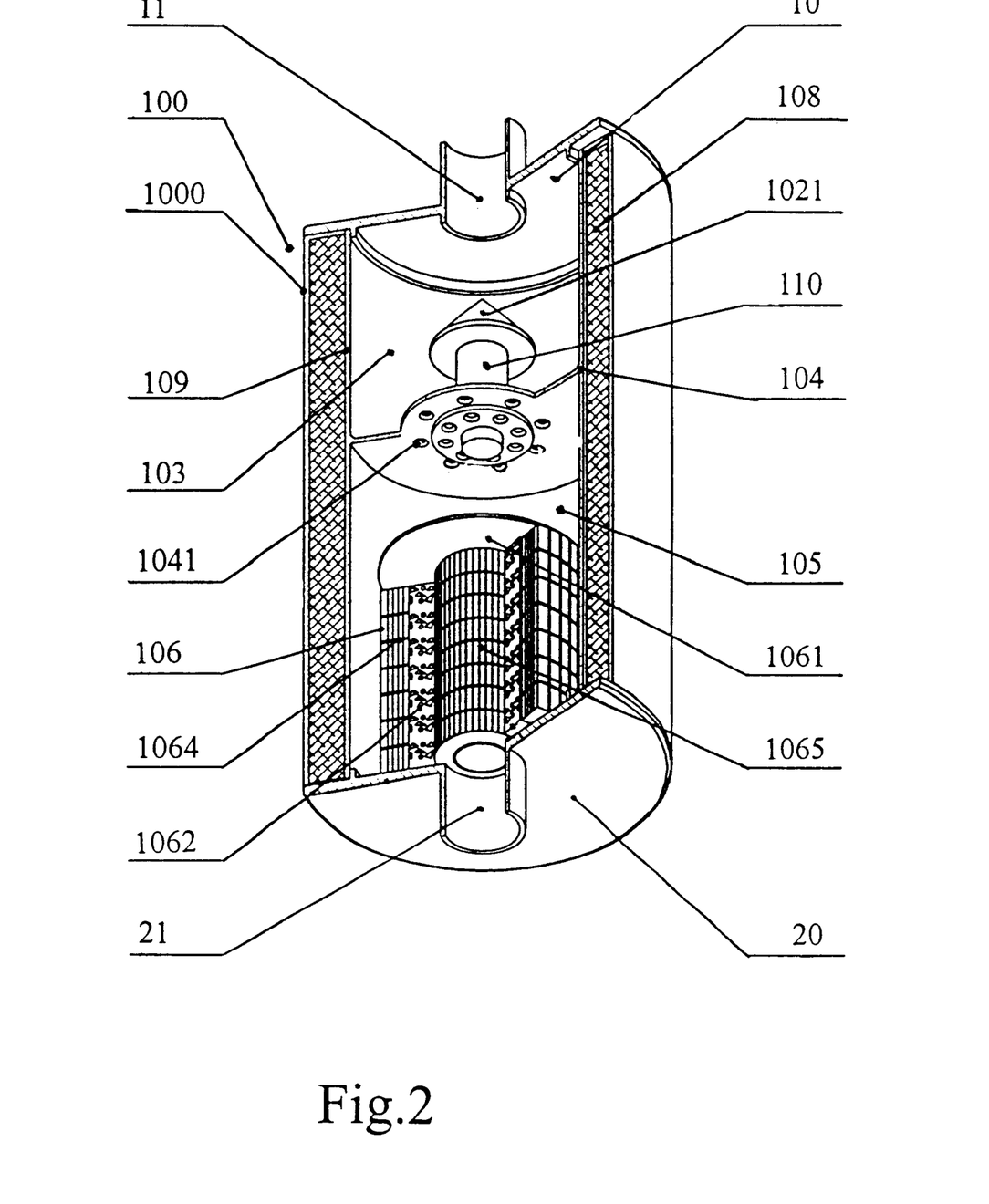
FIG. 2 is a sectional view of the vortex device as shown in FIG. 1.
Figure 10:
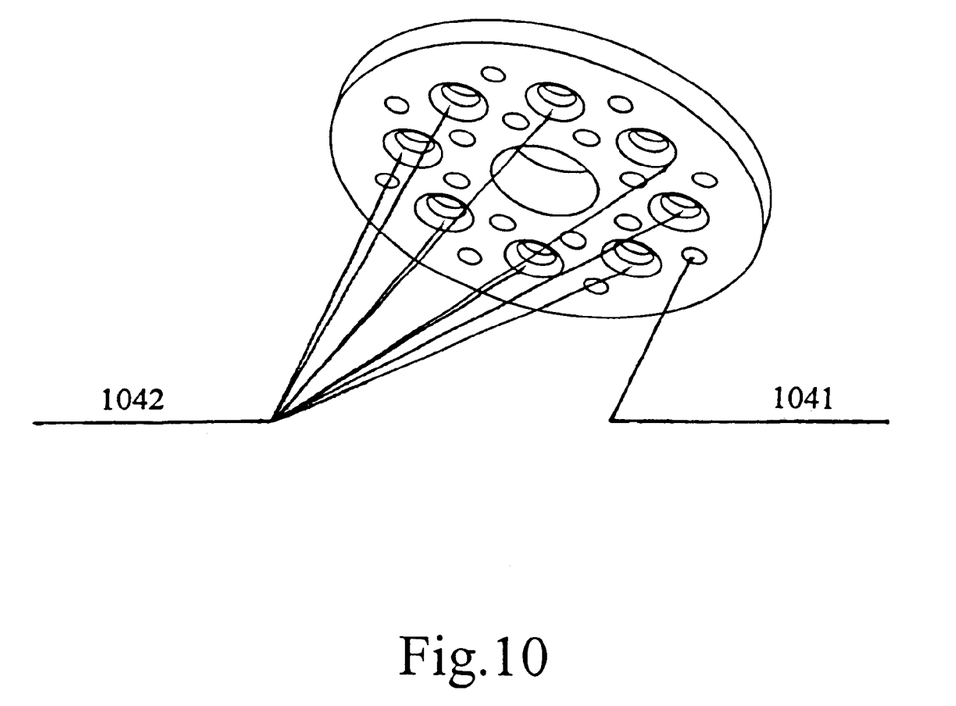
FIG. 10 is a schematic diagram of an embodiment of the first baffle board in the vortex device.

FIGS. 1 and 2 show a vortex device 100 of the invention for treating exhaust gas from an internal combustion engine. The vortex device includes a first housing 1000 with a first end surface 10 and a second end surface 20. The first end surface 10 has a first inlet 101 that is connected to the exhaust tube (not shown) of the internal combustion engine. A first baffle board 104 is fixedly connected to the inside wall of the first housing. The first housing 1000 may be formed in the shape of a cylinder or the like. A first vortex mechanism 102 is connected to the first baffle board 104. In an embodiment of the vortex mechanism, it includes a vortex cone 1021 fixed to the first baffle board 104. In another embodiment of the invention, as shown in FIGS. 1 and 2, the first vortex mechanism may further include a cylindrical connection 110 positioned between the vortex cone 1021 and the first baffle board 104. The first baffle board 104 has a plurality of gas holes 1041. The surface of first baffle board facing the first end surface can be designed uneven to enhance the vortex of the exhaust gas. As shown in FIG. 10, for example, a plurality of bumps or hollows 1042 around the gas holes 1041 can be formed on the surface of the first baffle board 104.

A catalytic filter 106 is disposed within the first housing 1000. The catalytic filter is fixed to the second end surface 20 and faces the first baffle board 104. The catalytic filter 106 includes a first filter casing 1064 within which a second filter casing 1065 is fixed. The first filter casing and second filter casing may be formed in the shape of a cylinder or the like. The room embraced by the second filter casing communicates with the outlet 21 of the second end surface 20. The first filter casing and the second filter casing have the same closed end 1061. A catalyst 1062 comprising aluminum beads and small porcelain sheets is charged between the first filter casing and the second filter casing. The inside wall of the first housing 1000 between the first end surface and the first baffle board may be an $Al_2O_3$ layer 109. The surface of the first baffle board facing said third end surface may be coated with metal Cu.

Thus, when exhaust gas a higher pressure and a higher temperature from the internal combustion engine enters a vortex chamber 103 from the exhaust tube, the exhaust gas first encounters the first vortex mechanism 102 and a vortex is formed in the vortex chamber 103 by the vortex cone 1021 and the first baffle board 104. The temperature of the exhaust gas is hereby increased due to the vortex motion of the exhaust gas. At the same time, the exhaust gas within the vortex chamber can be kept at a higher pressure. As a result, exhaust gas emitted from an exhaust manifold cannot enter the exhaust tube immediately, but returns into the engine through another manifold for further combustion. Output power of the internal combustion engine is hereby increased. Moreover, the exhaust gas can undertake further catalytic reactions for CO, HC and NOx therein in the presence of Cu on the surface of the first baffle board and $Al_2O_3$ on the inside wall of the housing. In the preferred embodiment of the vortex device of the invention, in the first housing 1000 is provided a thermal insulation 108. This can be done by charging within the housing insulating materials such as clay and asbestos or a mixture thereof.

The content of CO, HC and NOx in the exhaust gas will be lowered before the exhaust gas enters a chamber 105 between the first baffle board 104 and the second end surface 20 from the gas holes 1041 on the first baffle board. The exhaust gas then flows through the first filter casing 1064 and the second filter casing 1065 and is exhausted from the exhaust outlet 21. At the same time, exhaust gas contacts the catalyst 1062 so that some substances with a higher molecular weight can be further decomposed. The first and second filter casings can remove any particulates existing in the exhaust gas.

Figure 3:
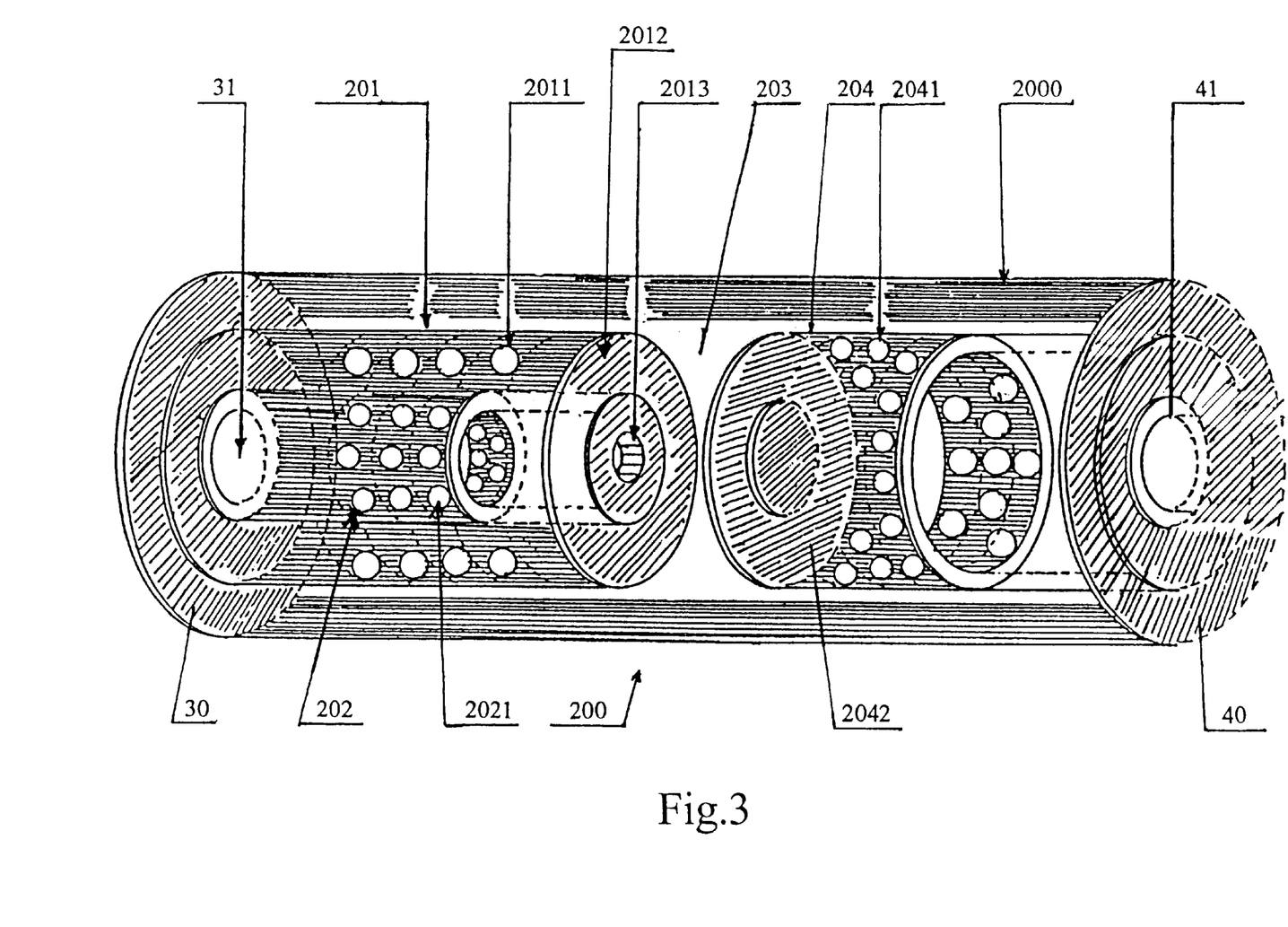
FIG. 3 is a schematic diagram of a first treating device of the system of the invention.
Figure 4:
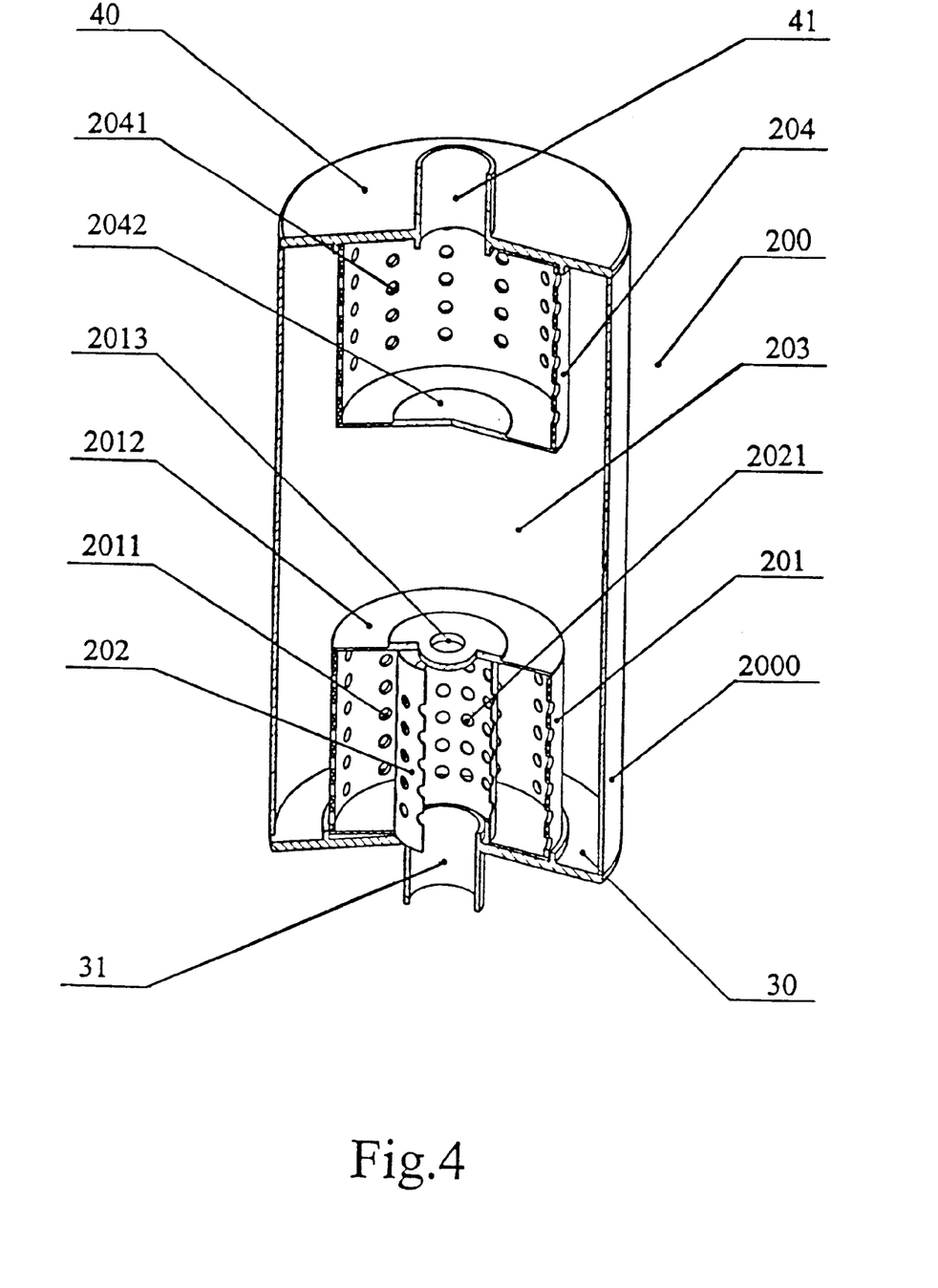
FIG. 4 is a sectional view of the first treating device as shown in FIG. 3.

FIGS. 3 and 4 show an embodiment of the first treating device 200 of the system according to the invention. The first treating device 200 comprises a second housing 2000 with a third end surface 30 and a fourth end surface 40. In the second housing is provided a first casing 201 whose one end is connected to the third end surface 30, and a second casing 202 positioned within the first casing 201. The first and second casings 201, 202 are fixed to the third end surface 30. There is a gas hole 2013 at the end 2012 of the first casing 201 to communicate with an inlet 31 on the third end surface 30. In the embodiment, the first and second casings are cylindrical and have a plurality of through holes 2011 and 2021 on their side walls. The gas hole 2013 may have a smaller diameter than the opening of the inlet 31 so that the exhaust gas is not easily emitted from the hole 2013 directly, but enters the space defined between the first casing and the second casing, then spreads into a room 203 within the second housing, and finally is released from an outlet 41 on the fourth end surface 40.

FIGS. 3 and 4 also show another embodiment of the first treating device, which further comprises a treating cylinder 204 fixedly connected to the fourth end surface 40 of the system. The cylinder 204 has a closed end 2042 and a plurality of gas holes 2041 on the side wall. In this case, the exhaust gas emitted from the holes 2013 and 2011 first enters the cylinder 204 through the holes 2041 before exhausted from the outlet 41.

Thus, when exhaust gas enters the first treating device 200 from the vortex device 100, a part of the exhaust gas spreads through the holes 2021 into the space defined by the first casing and second casing, then further spreads outwards from the holes 2011. In the case of the presence of the cylinder 204, the exhaust gas in the room 203 should enter the cylinder 204 through the holes 2041 before emitted from the outlet 41. The temperature of the exhaust gas will be lowered after multi-step spread. Since the frequency of the flow of the exhaust gas can be changed due to the change of the flow directions, the noise can be lowered significantly. Preferably, the holes 2011, 2021, and 2041 are designed to be of an irregular surface to enhance the effect of the muffling.

After treated with the first treating device, the temperature of the exhaust gas is lowered. Water steam in the exhaust is cooled to be liquid water, if any. Meanwhile, exhaust gas is muffled.

Figure 5:
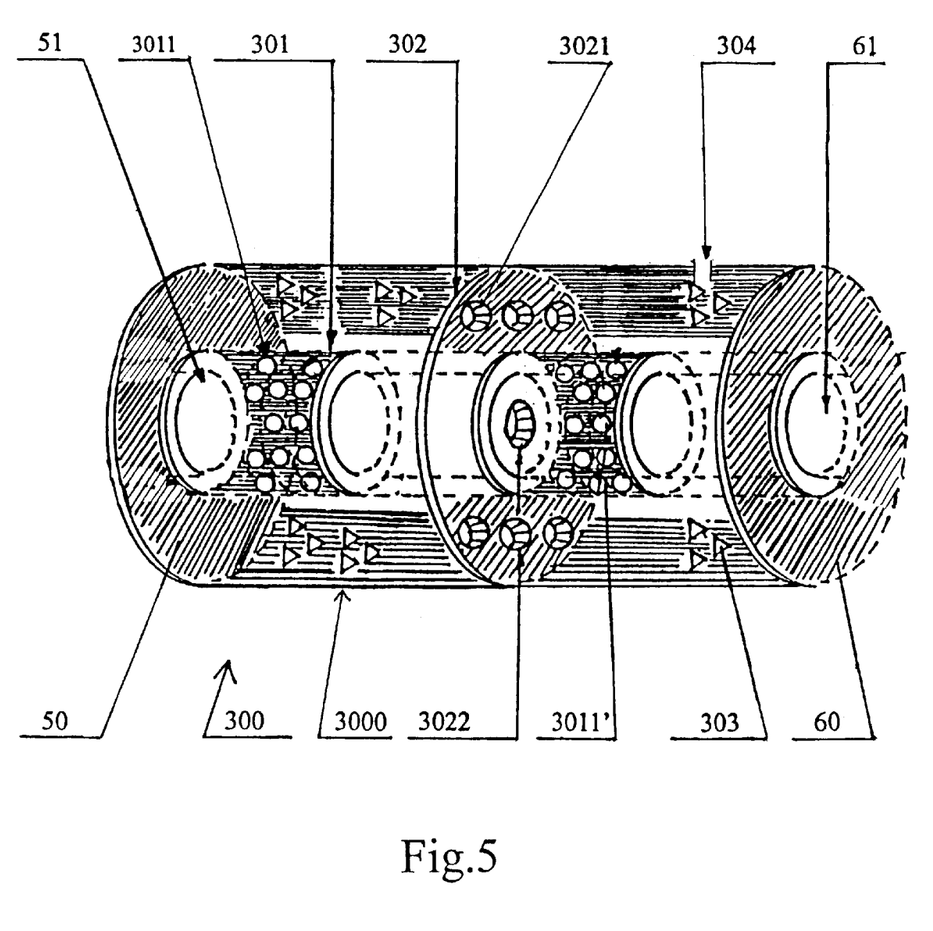
FIG. 5 is a schematic diagram of a second treating device of the system of the invention.
Figure 6:
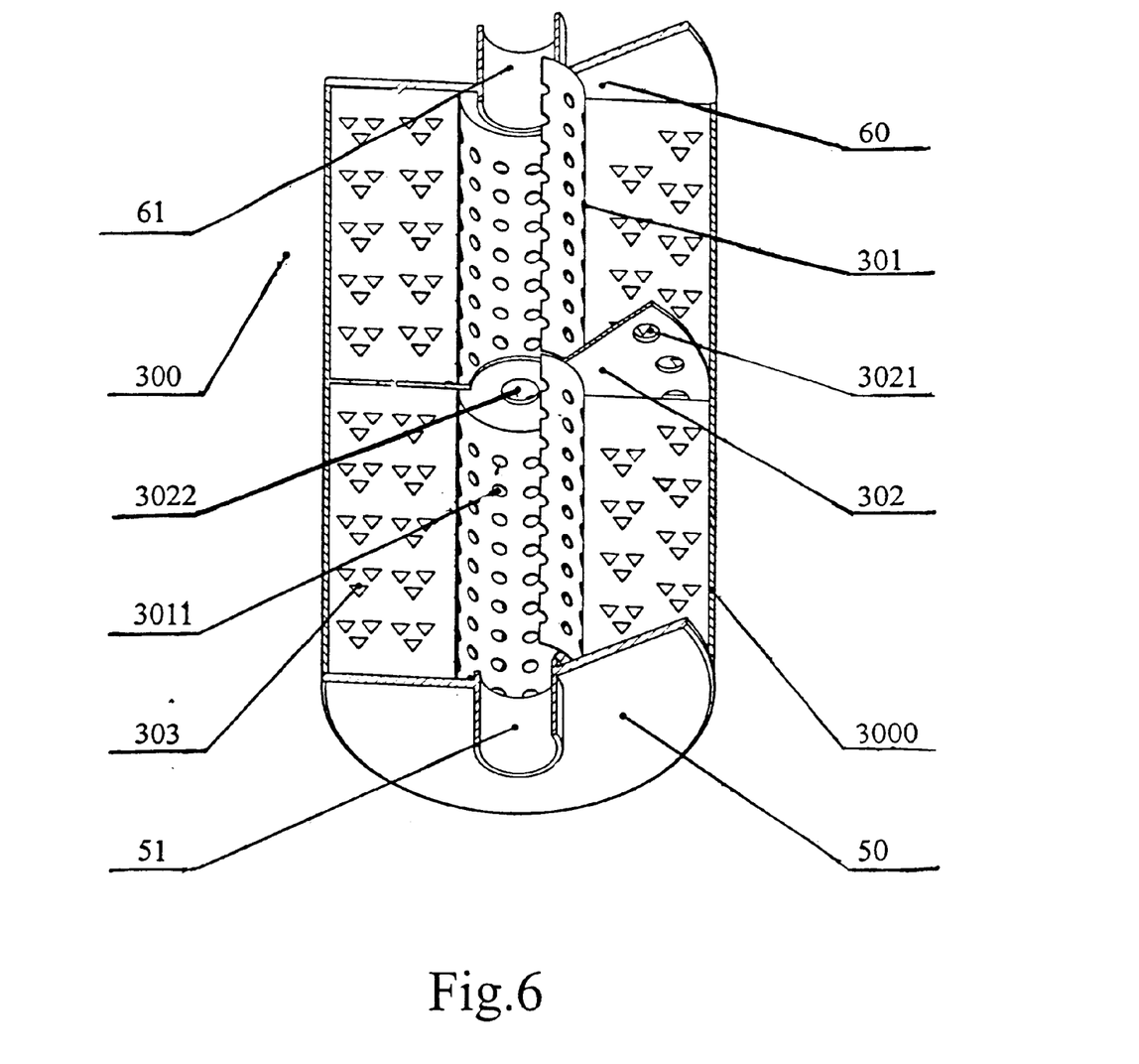
FIG. 6 is a sectional view of the second treating device as shown in FIG. 5.

Referring to FIG. 5 and FIG. 6, a second treating device 300 of the system of the invention includes a third housing 3000 with a fifth end surface 50 and a sixth end surface 60. In the third housing 3000, a second baffle board 302 is longitudinally disposed between the fifth end surface 50 and the sixth end surface 60. A third casing 301 passing through the second baffle board 302 is respectively connected to the fifth end surface and the sixth end surface. The side wall of the third casing 301 has a plurality of gas holes 3011, 3011'. The portion of the second baffle board 302 between the third casing 301 and the third housing has a plurality of gas holes 3021, and the portion thereof within the third casing 301 has a gas hole 3022 so that the exhaust gas can also flow within the third casing between the fifth end surface and the sixth end surface. An absorbing agent is charged between the third housing and the third casing. In the invention, preferably the absorbing agent is charcoal. In one embodiment of the invention, the diameter of the gas hole 3022 is smaller than that of gas holes 3011 so that the exhaust gas from an inlet 51 emits from the holes 3011 as much as possible, then enters the third casing 301 through the holes 3021 and holes 3011' to ensure that the exhaust gas is fully absorbed.

In one embodiment of the invention, the second treating device further comprises a gas-returning outlet 304 from which a part of the exhaust gas in the second treating device can be introduced back to the cylinder of the internal combustion engine to reuse flammable gases in the exhaust gas.

Absorbable particles in the exhaust gas will be removed before emitted from the outlet 61 of the sixth end surface with the treatment of the second treating device, and the temperature and pressure of the exhaust gas will be further lowered.

Figure 7:
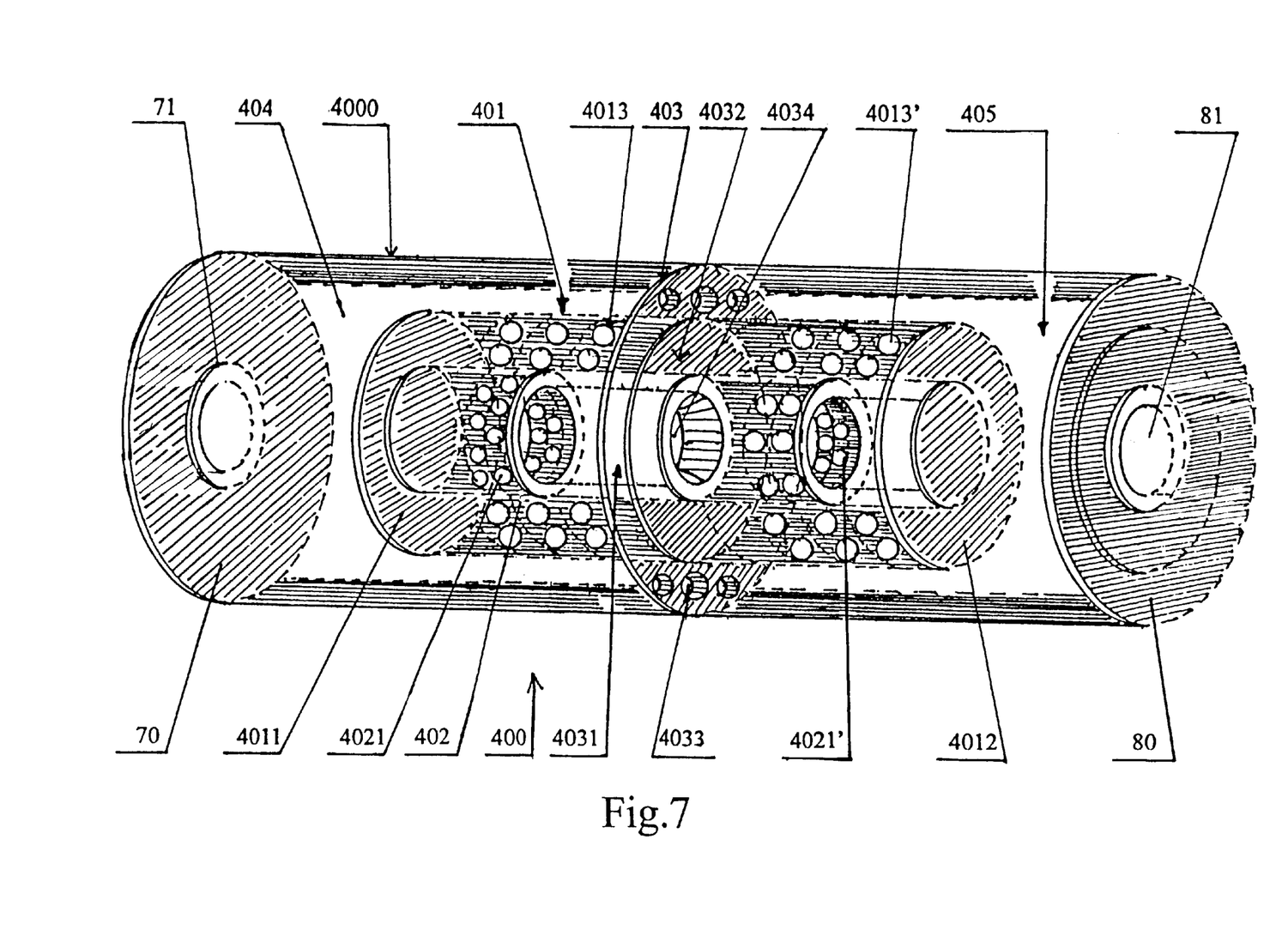
FIG. 7 is a schematic diagram of a third treating device of the system of the invention.
Figure 8:
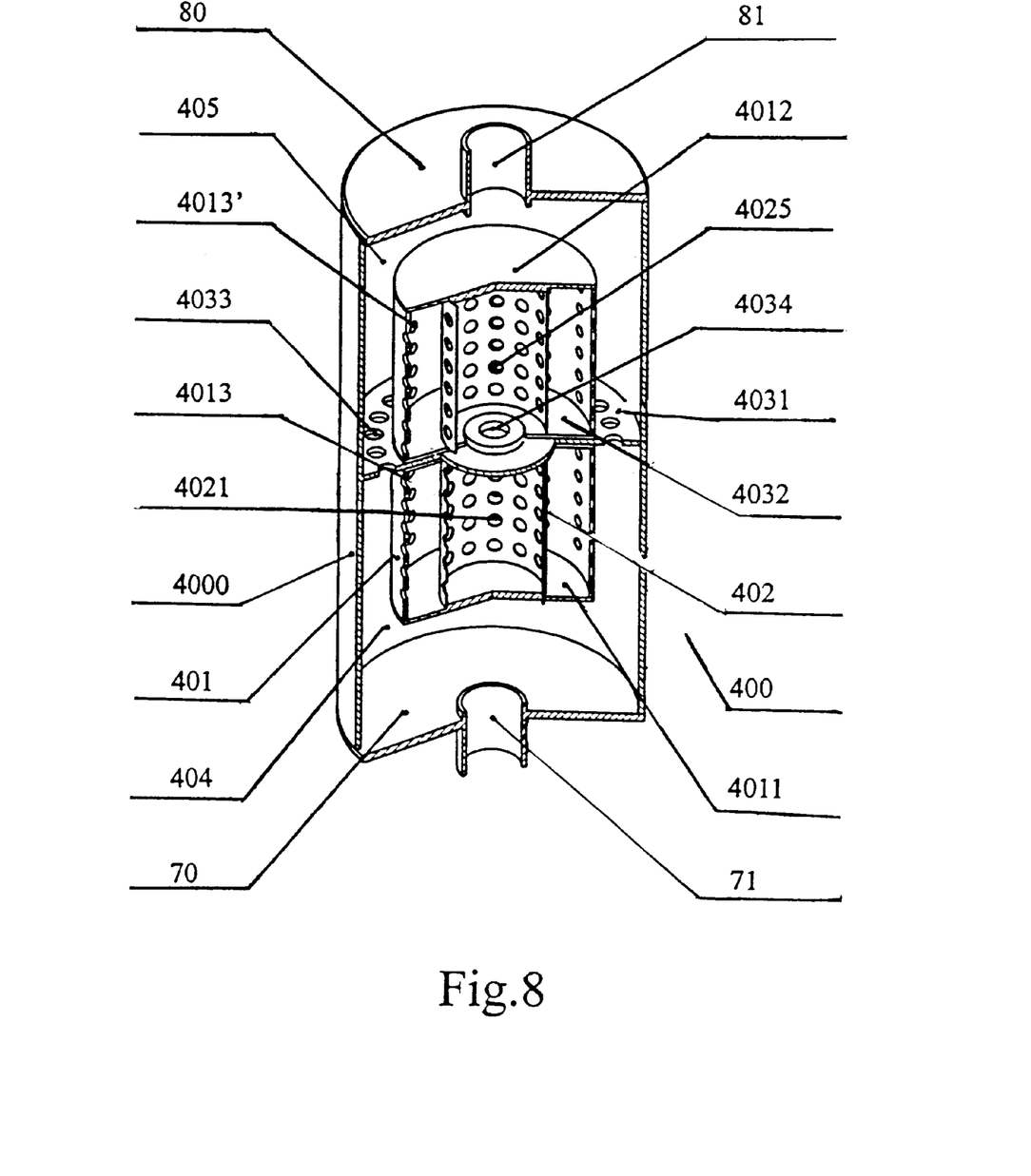
FIG. 8 is a sectional view of the third treating device as shown in FIG. 7.

A third treating device 400 of the system of the invention is shown in FIG. 7 and FIG. 8. The third treating device 400 includes a fourth housing 4000 with a seventh end surface 70 and an eighth end surface 80. A third baffle board 403 is longitudinally positioned between the seventh end surface and the eighth end surface. Through the baffle board 403, a fourth casing 401 is set longitudinally within the fourth housing 4000. A fifth casing 402 is provided within the fourth casing 401 and connected thereto. The fourth casing 401 and the fifth casing 402 shares the same two closed ends 4011 and 4012. The third baffle board 403 has a portion 4031 defined between the fourth casing 401 and the fourth housing 4000, and a portion 4032 between the fourth casing 401 and the fifth casing 402. The portion 4031 has a plurality of gas holes 4033. The portion of the third baffle board within the fifth casing has a gas channel 4034.

When the exhaust gas enters a chamber 404 of the third treating device 400 through an inlet 71 of the seventh end surface 70, a part of it enters the fourth casing 401 from the chamber 404 through gas holes 4013 on the side wall of the fourth casing 401 and gas holes 4021 on the side wall of the fifth casing 402, then it flows out of the fourth casing 401 to enter a chamber 405 through the channel 4034, and holes 4021' and 4013', successively. Meanwhile, the other exhaust gas directly enters the chamber 405 from the chamber 404 through the gas holes 4033. The exhaust gas in the chamber 405 is exhausted out of the third treating device from an outlet 81 of the eighth end surface 80.

After the treatment of the third treating device, the exhaust gas can be further muffled and the temperature is decreased further since its flow direction and flow speed are changed many times. In one embodiment of the third treating device, the diameter of the holes 4013 and 4013' is larger than that of the holes 4021 and 4021', respectively. Moreover, the surface of all the holes in the third treating device 400 is irregular to enhance the muffling of the exhaust gas.

Figure 9:
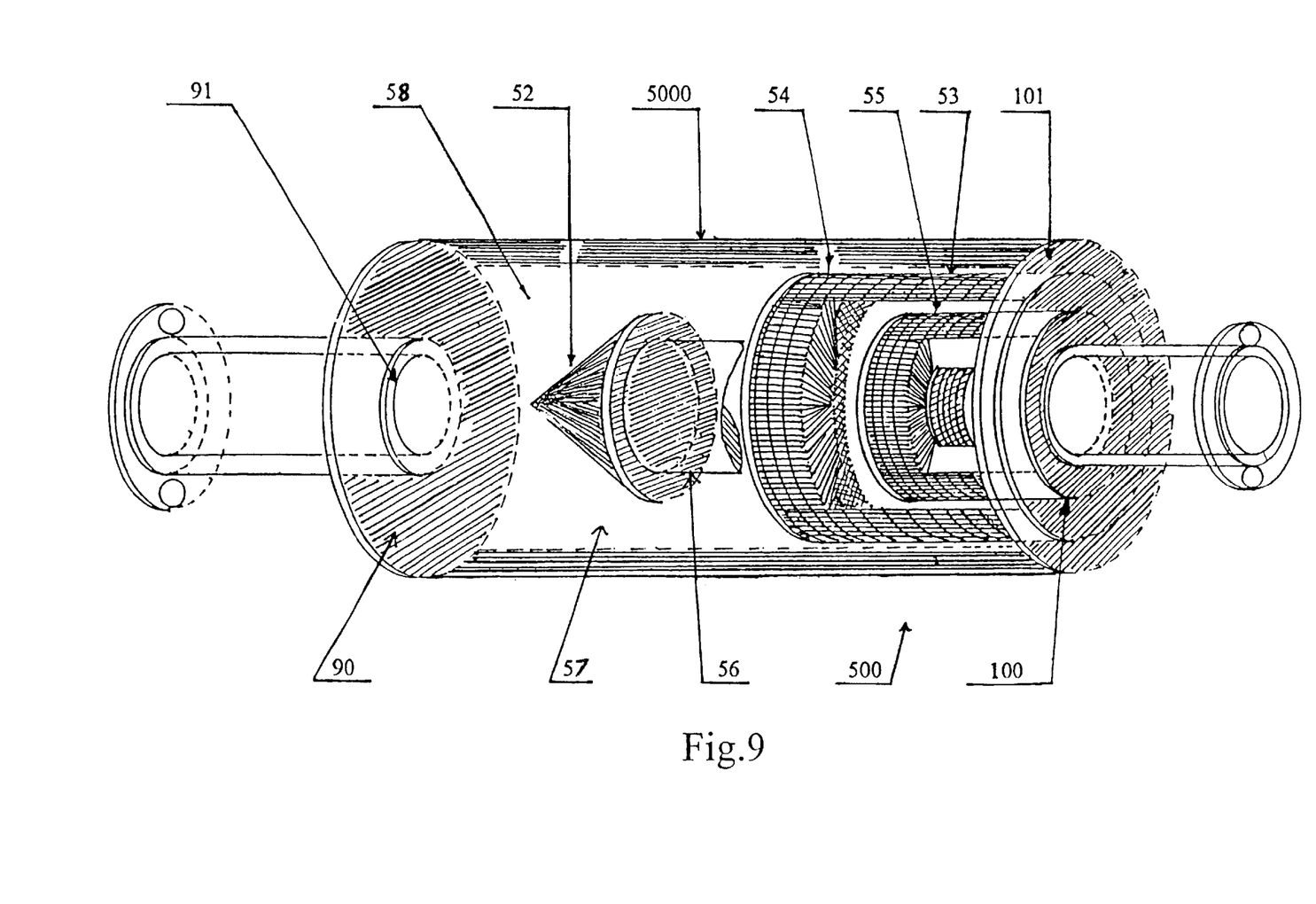
FIG. 9 is a schematic diagram of a fourth treating device of the system of the invention.

In case the internal combustion engine is a diesel engine, the system of the invention may include a fourth treating device 500 instead of the third treating device 400. As shown in FIG. 9, the fourth treating device 500 includes a fifth housing 5000 with a ninth end surface 90 and a tenth end surface 100. A filter 53 fixed to the tenth end surface 80 is provided within the fifth housing 5000. A second vortex mechanism 57 is connected to the filter 53. As indicated in FIG. 9, the second vortex mechanism 57 comprises a vortex cone 52 and a connection 56 fixed to the filter 53. As is known by the skilled in the art, the vortex mechanism can be formed in other manners. For example, the vortex mechanism may be a ball or semi-ball connected directly to the filter 53. The filter 53 as shown in this figure is a double-filtering-element filter including filter elements 54 and 55. In the preferred embodiment, the filter is a paper filter.

Thus, the exhaust gas from the third treating device enters a chamber 58 of the fourth treating device 500 through an inlet 91 of the ninth end surface 90. Then, the exhaust enters the filter 53 after spread by the second vortex mechanism, and finally is released from the outlet 101 of the tenth end surface 100. All the particles in the exhaust resulted from the combustion of diesel oil will be removed with the treatment of the fourth treating device.

The output power of the internal combustion engine can be increased by 20–45% with the system of the invention. The temperature of the exhaust gas can be lowered to 32°–70° C. Moreover, the cold start of the engine is completed within 2–5 seconds, and the engine can operates stably and silently, with the system of the invention.

It is obvious that if all the treating devices in the system of the invention can be integrated, some elements of the system in the invention can be combined. For example, the second end surface can also used as the third end surface, and the first housing can be extended to involve from the second housing to the fifth housing.

It should be appreciated by those skilled in the art that the above embodiment and description is only utilized to illustrate the invention. Any modification and variation to the invention without departure from the spirt of the invention should fall within the scope of the invention.

What is claimed is:

1. A vortex device for treating exhaust gas from an internal combustion engine comprising:
   a first housing having a first end surface and a second end surface;
   a first inlet positioned on said first end surface and connected to an exhaust tube of said internal combustion engine;
   a first outlet positioned on said second end surface;
   a first baffle board fixedly connected to said first housing, having a plurality of gas holes;
   a first vortex mechanism connected to said first baffle board; and a catalytic filter comprising
      a first cylindrical filter casing connected to said second end surface of said first housing; and
      a second cylindrical filter casing, positioned within said first cylindrical filter casing and connected to said second end surface of said first housing,
      wherein a gas channel embraced by said second cylindrical filter casing communicates with said first outlet, and a particle catalyst is charged between said first cylindrical filter casing and said second cylindrical filter casing so that exhaust gas can flow from the outside of said first cylindrical filter casing into the inside of said second cylindrical filter casing.

2. A vortex device according to claim 1, wherein said first vortex mechanism comprises a vortex cone connected to said first baffle board.

3. A vortex device according to claim 2, wherein said vortex cone is connected to said first baffle board through a cylindrical connection.

4. A vortex device according to claim 2, wherein said vortex cone faces said first inlet, and the bottom of said vortex cone covers an area where said gas holes locate on said first baffle board.

5. A vortex device according to claim 1, wherein said first housing has an inside wall made from $Al_2O_3$ between said first end surface and said first baffle board, and the surface of said first baffle board is coated with Cu.

6. A vortex device according to claim 1, wherein said first housing further comprises a thermal insulation layer.

7. A system for treating exhaust gas from an internal combustion engine comprising:
 a) a vortex device including
   a first housing having a first end surface and a second end surface;
   a first inlet positioned on said first end surface and connected to an exhaust tube of said internal combustion engine;
   a first outlet positioned on said second end surface;
   a first baffle board fixedly connected to said first housing, having a plurality of gas holes;
   a first vortex mechanism connected to said first baffle board; and
 a catalytic filter comprising
   a first cylindrical filter casing connected to said second end surface of said first housing; and
   a second cylindrical filter casing, positioned within said first cylindrical filter casing and connected to said second end surface of said first housing, wherein a gas channel embraced by said first cylindrical filter casing is communicated with said first outlet, and a particle catalyst is filled between said first cylindrical filter casing and said second cylindrical filter casing so that exhaust gas can flow from the outside of said first cylindrical filter casing into the inside of said second cylindrical filter casing, and
 b) a first treating device including
   a second housing having a third end surface and a fourth end surface;
   a second inlet positioned on said third end surface;
   a second outlet positioned on said fourth end surface;
   a first casing whose one end is connected to said third end surface and another end comprises a flow-limiting hole; and
   a second casing positioned within said first casing, whose one end is communicated with said second inlet of the third end surface, and another end shares the same flow-limiting hole with said first casing, wherein side walls of said first casing and said second casing have a plurality of gas holes.

8. A system according to claim 7 further containing a second treating device including:
 a third housing having a fifth end surface and a sixth end surface;
 a third inlet positioned on said fifth end surface;
 a third outlet positioned on said sixth end surface;
 a third casing respectively connected to said fifth end surface and said sixth end surface; and
 a second baffle board longitudinally positioned between said fifth end surface and said sixth end surface,
 wherein the side wall of said third casing and the portion of said second baffle board between said third housing and said third casing have a plurality of gas holes, and the portion of said second baffle board inside said third casing has a flow-limiting hole.

9. A system according to claim 8 further containing a third treating device including:
 a fourth housing having a seventh end surface and an eighth end surface;
 a fourth inlet positioned on said seventh end surface;
 a fourth outlet positioned on said eighth end surface;
 a fourth casing having two closed ends within said fourth housing;
 a fifth casing within said fourth casing, connected to the two ends of said fourth casing; and
 a third baffle board longitudinally positioned between said seventh end surface and said eighth end surface, and connected to said housing to support said fourth casing,
 wherein the portion of said third baffle board between said fourth housing and said fourth casing has a plurality of gas holes, the portion of said third baffle board within said fifth casing has an exhaust opening, and the side walls of said fourth casing and said fifth casing have a plurality of muffling holes.

10. A system according to claim 9, wherein a gas-returning outlet is provided on said third housing so that a part of exhaust gas can be returned to said internal combustion engine.

11. A system according to claim 8 further containing a fourth treating device including:
 a fifth housing having a ninth end surface and a tenth end surface;
 a sixth inlet positioned on said ninth end surface;
 a sixth outlet positioned on said tenth end surface;
 a double-filter-element filter fixedly connected to said tenth end surface; and a second vortex mechanism comprising a vortex cone and a cylindrical connection that is connected to said double-filter-element filter.

12. A system according to claim 8, wherein said first vortex mechanism has an inside wall made from $Al_2O_3$ between said first end surface and said first baffle board, and the surface of said first baffle board is coated with Cu.

13. A system according to claim 8, wherein said first vortex mechanism comprises a vortex cone connected to said first baffle board through a cylindrical connection.

14. A system according to claim 13, wherein said vortex cone faces said first inlet, and the bottom of said vortex cone covers an area where said gas holes locate on said first baffle board.

15. A system according to claim 14, wherein all the holes of said first treating device and said third treating device are of an irregular surface.

16. A system according to claim 7, wherein said first vortex mechanism has an inside wall made from $Al_2O_3$ between said first end surface and said first baffle board, and the surface of said first baffle board is coated with Cu.

17. A system according to claim 11, wherein said first treating device further comprises a cylinder fixed to said fourth end surface and facing said first casing, whose side wall has a plurality of gas holes.

18. A system according to claim 7, wherein said first vortex mechanism comprises a vortex cone connected to said first baffle board through a cylindrical connection.

19. A system according to claim 18, wherein said vortex cone faces said first inlet and the bottom of said vortex cone covers an area where said gas holes locate on said first baffle board.

20. A system according to claim 19, wherein said first treating device further comprises a cylinder fixed to said fourth end surface and facing said first casing, whose side wall has a plurality of gas holes.

* * * * *